United States Patent
Krogh et al.

(10) Patent No.: US 9,823,664 B2
(45) Date of Patent: Nov. 21, 2017

(54) UNMANNED AIRCRAFT FOR POSITIONING AN INSTRUMENT FOR INSPECTION PURPOSES AND METHODS OF INSPECTING A TARGET SURFACE

(71) Applicant: A.M.T.S., LLC, Kansas City, MO (US)

(72) Inventors: Michael L. Krogh, Lee's Summit, MO (US); Ed DeMoss, Lone Jack, MO (US)

(73) Assignee: A.M.T.S., LLC, Kansas City, MO (US)

( * ) Notice: Subject to any disclaimer, the term of this patent is extended or adjusted under 35 U.S.C. 154(b) by 0 days.

(21) Appl. No.: 15/053,455

(22) Filed: Feb. 25, 2016

(65) Prior Publication Data

US 2017/0248967 A1 Aug. 31, 2017

(51) Int. Cl.
| | |
|---|---|
| *G05D 1/04* | (2006.01) |
| *B64D 45/00* | (2006.01) |
| *G01C 5/00* | (2006.01) |
| *G01S 19/42* | (2010.01) |
| *B64D 47/08* | (2006.01) |
| *G01S 17/06* | (2006.01) |

(52) U.S. Cl.
CPC ............. *G05D 1/042* (2013.01); *B64D 45/00* (2013.01); *B64D 47/08* (2013.01); *G01C 5/005* (2013.01); *G01S 17/06* (2013.01); *G01S 19/42* (2013.01); *G05D 2201/0207* (2013.01)

(58) Field of Classification Search
CPC ........... G05D 1/042; G05D 2201/0207; B64D 45/00; B64D 47/08; G01C 5/005; G01S 17/06; G01S 19/42
See application file for complete search history.

(56) References Cited

U.S. PATENT DOCUMENTS

| | | |
|---|---|---|
| 5,190,242 A | 3/1993 | Nichols |
| 8,060,270 B2 | 11/2011 | Vian |
| 8,336,808 B2 | 12/2012 | Challis |
| 8,590,828 B2 | 11/2013 | Marcus |
| 8,712,679 B1 | 4/2014 | Mostofi |
| 9,148,753 B2 | 9/2015 | Manber |
| 2005/0151001 A1 | 7/2005 | Loper |
| 2008/0125920 A1 | 5/2008 | Miles |
| 2009/0008499 A1 | 1/2009 | Shaw |

(Continued)

FOREIGN PATENT DOCUMENTS

| | | |
|---|---|---|
| CN | 103359283 A | 6/2013 |
| DE | 19745492 A1 | 10/1997 |

(Continued)

*Primary Examiner* — Michael D Lang
(74) *Attorney, Agent, or Firm* — Stinson Leonard Street LLP

(57) ABSTRACT

A method of positioning an instrument by an unmanned aircraft for measurement purposes relating to a target surface is provided. The method includes coupling the instrument to the unmanned aircraft and moving the unmanned aircraft to position the instrument away from the target surface. The method further includes stabilizing the unmanned aircraft to maintain a constant altitude and a level attitude relative to the target surface and orientating the instrument perpendicular to the target surface. A measurement is conducted by the instrument while the instrument is orientated perpendicular to the target surface. The method also includes transmitting the measurement to a receiver.

25 Claims, 3 Drawing Sheets

(56) References Cited

U.S. PATENT DOCUMENTS

| | | |
|---|---|---|
| 2010/0044499 A1 | 2/2010 | Dragan |
| 2010/0108801 A1* | 5/2010 | Olm .................... B64C 39/024 |
| | | 244/17.23 |
| 2010/0243794 A1 | 9/2010 | Jermyn |
| 2014/0316614 A1 | 10/2014 | Newman |
| 2014/0336928 A1 | 11/2014 | Scott |
| 2015/0262397 A1 | 9/2015 | Eastman |
| 2015/0304576 A1 | 10/2015 | Horak |
| 2016/0159472 A1* | 6/2016 | Chan ...................... B64C 27/08 |
| | | 244/39 |
| 2016/0244160 A1* | 8/2016 | Colten ................ B64C 39/024 |
| 2017/0038405 A1* | 2/2017 | Zhou ......................... G01P 3/38 |

FOREIGN PATENT DOCUMENTS

| WO | WO03074924 A1 | 9/2003 |
|---|---|---|
| WO | WO2015134453 A1 | 9/2015 |

\* cited by examiner

US 9,823,664 B2

UNMANNED AIRCRAFT FOR POSITIONING AN INSTRUMENT FOR INSPECTION PURPOSES AND METHODS OF INSPECTING A TARGET SURFACE

BACKGROUND

The field of the disclosure relates generally to systems and methods for performing inspection and measurement activities, and more particularly, to a systems and methods for enabling remote inspection of target surfaces or structures by an unmanned aircraft.

In person human based inspections of structures and various types of target surfaces can be time consuming, expensive, difficult and often dangerous for an individual to perform. Examples of structures that pose significant challenges in inspecting: are bridges, dams, levees, power plants, buildings, power lines or electrical power grids, water treatment facilities, oil refineries, chemical processing plants, high rise buildings, land surveying, and construction sites.

The use of static cameras (for example, fixedly mounted cameras) to provide periodic pictures of a structure or object requiring periodic visual inspection can have limited effectiveness. Static cameras have a limited field-of-view. Therefore, inspecting a large area, such a power line stretching hundreds of meters or more, is difficult without using a large number of such cameras. Furthermore, once a camera is mounted in place, it may not be easily accessible for repair or maintenance. The mounting of the camera may require it to be exposed to the elements, which can decrease the reliability and/or cost of operation of the camera.

Infrastructure may require inspection where because of environmental, chemical or biological elements the inspection would place a human worker at significant, risk to his or her health. Such a situation might be found inside a manufacturing facility, where a periodic regular inspection of a portion of the facility or machines operating within it, in areas where harmful chemicals may be present, needs to be made. Still other structures, for example large antennas or telescopes located on mountains, can present situations where inspection by a human presents significant risk to the individual's safety.

In some inspection applications, human piloted helicopters have been used to inspect various infrastructures. However, human piloted helicopters can be expensive to operate in terms of asset cost (helicopter, fuel and maintenance) and operational cost (pilot salary). In addition, inspection is limited by the available number of pilots and helicopters and can be hazardous in some instances, such as during rain or dust storms.

Some inspection procedures use an unmanned aircraft for surveying, inspecting, and measuring structures or surfaces. Conventional unmanned aircraft, however, tend to focus on flight and control first, while payload can be considered a secondary consideration. Typical instrumentation payload may have to adapt to the environment the flight system experiences. Conventional unmanned aircraft may include specific gimbals, vibration control, and gimbal ready verification system to activate the instrumentation. These current unmanned systems can be complex, expensive, heavy, and high energy consumers.

Moreover, some unmanned aircraft may require an angle of approach to accomplish different positions for inspection. Current unmanned aircraft may require a positive angle of approach to maintain altitude and require to gimbals to compensate for prevailing winds. Other unmanned aircraft may require a negative angle of approach in order to move forward and pitch into the wind for drift. These types of umnanned aircraft may require separate and costly stabilization platforms for instrumentation which further add weight and complexity to the unmanned aircraft.

SUMMARY

In one aspect, a method of positioning an instrument by an unmanned aircraft for measurement purposes relating to a target surface is provided. The method includes coupling the instrument to the unmanned aircraft and moving the unmanned aircraft to position the instrument away from the target surface. The method further includes stabilizing the unmanned aircraft to maintain a constant altitude and a level attitude relative to the target surface and orientating the instrument perpendicular to the target surface. A measurement is conducted by the instrument while the instrument is orientated perpendicular to the target surface. The method also includes transmitting the measurement to a receiver.

In another aspect, an unmanned aircraft for positioning an instrument for measurement purposes relative to a target surface during flight operations of the unmanned aircraft is provided. The unmanned aircraft includes a frame having a first arm, a second arm, and a third arm coupled to each other. The frame is configured to couple to the instrument. A first motor propulsion system is coupled to the frame and configured to facilitate lift/altitude and attitude control for the frame. A second motor propulsion system is coupled to the frame configured to facilitate translation and drift control for the frame, wherein the first motor propulsion system and the second motor propulsion system are configured to stabilize the frame and to orientate the instrument perpendicular to the target surface during the flight operations.

In a further aspect, a system for inspecting a target surface is provided. The system includes an unmanned aircraft configured to inspect the target surface during flight operations of the unmanned aircraft. The unmanned aircraft includes a frame having a first arm, a second arm, and a third arm coupled to each other. The frame is configured to couple to the instrument. A first motor propulsion system is coupled to the frame and configured to facilitate lift/altitude and attitude control for the frame. A second motor propulsion system is coupled to the frame configured to facilitate translation and drift control for the frame. An instrument is coupled to the frame and configured to take a measurement relative to the target surface and transmit the measurement, wherein the first motor propulsion system and the second motor propulsion system are configured to stabilize the frame and to orientate the instrument perpendicular to the target surface during the flight operations. A centralized inspection station is electronically coupled to the instrument and configured to receive the measurement and analyze the measurement to facilitate generating a virtual model of the target surface.

BRIEF DESCRIPTION OF THE DRAWINGS

Features, aspects, and advantages of the present disclosure will become better understood when the following Detailed Description is read with reference to the accompanying drawings in which like characters represent like parts throughout, wherein.

DETAILED DESCRIPTION

The embodiments described herein relate to an unmanned aircraft and instrumentation for inspecting and measuring an object or surface. Moreover, the embodiments relate to an unmanned aircraft that is configured to conduct flight operations as a secondary role to a primary role of carrying an instrument during flight operations. The embodiments described herein facilitate delivering high accuracy inspection and/or measurement by the instrument. Additionally, the embodiments relate to an unmanned aircraft that does not require specific gimbals, vibration control, and gimbal ready verification system to activate the instrumentation. The embodiments described herein reduce complexity, weight, and energy consumption. Still further, the embodiments relate to an unmanned aircraft that is configured to move in a plurality of positions, during a plurality of environmental conditions, to facilitate maintaining the orientation of the instrument perpendicular to a target surface. The embodiments relate to an unmanned aircraft and instrumentation that is efficient and cost effective to design, build, operate, and maintain. It should be understood that the descriptions and figures that utilize a bridge surface as a target surface and laser as the instrument are exemplary only. The exemplary unmanned aircraft and instrumentation can be used for any type of infrastructure and terrain surfaces.

Figure 1:
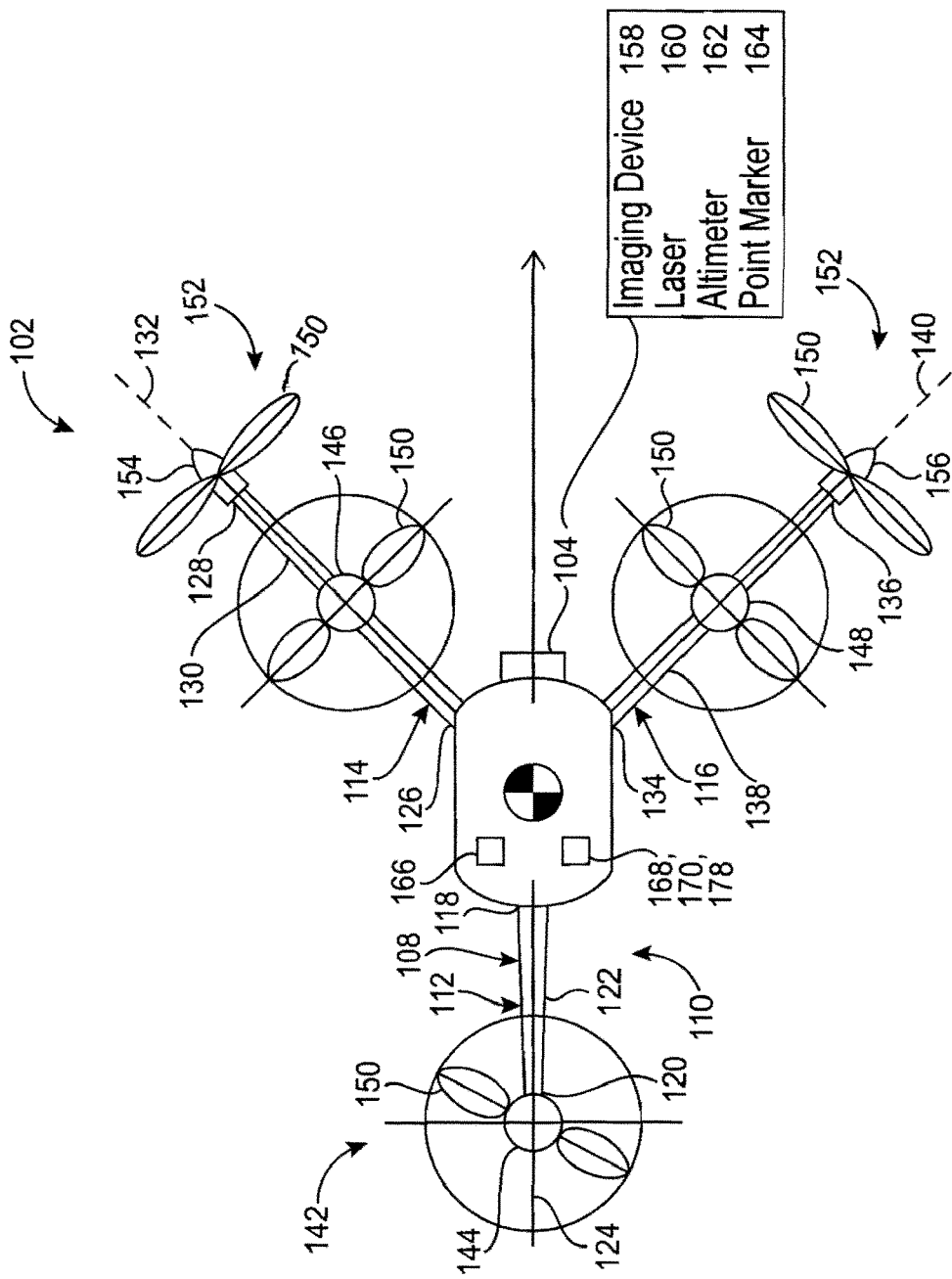
FIG. 1 is a schematic view of an exemplary an unmanned aircraft coupled to an instrument.
Figure 2:
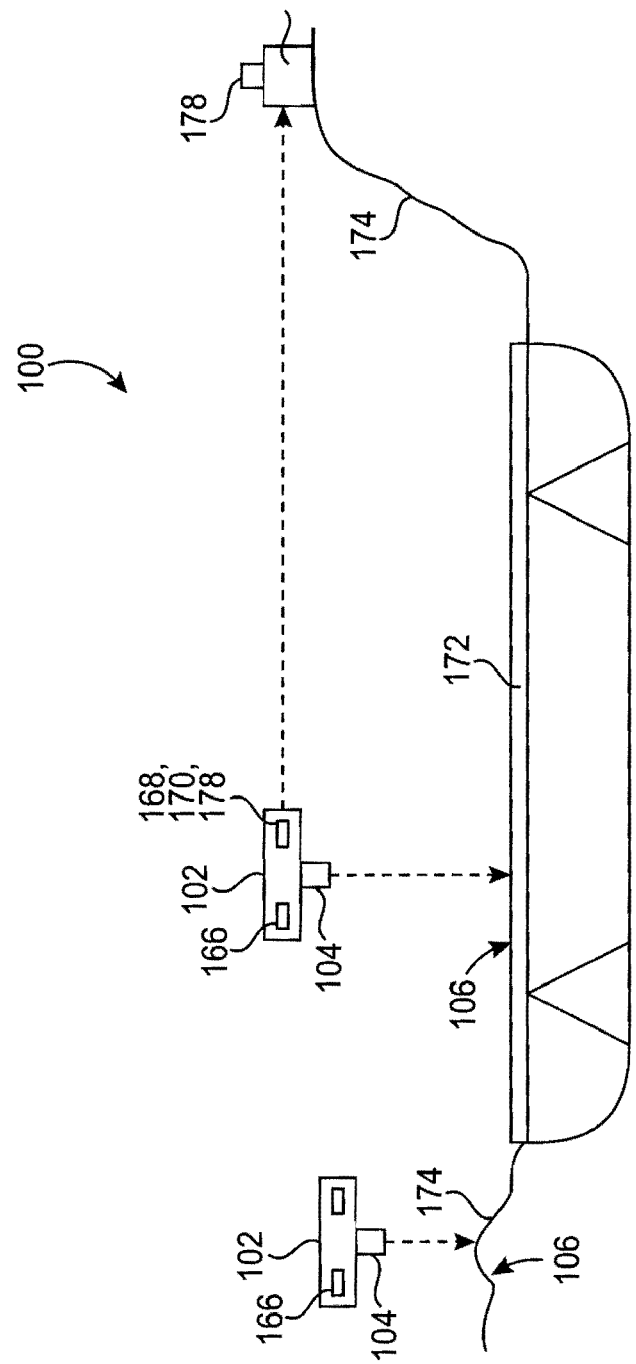
FIG. 2 is a side elevational view of an exemplary inspection system that includes the unmanned aircraft and instrument of FIG. 1 inspecting and measuring a target surface; and, in communication with a station.

FIG. 1 is a schematic view of an unmanned aircraft 102 coupled to an instrument 104. FIG. 2 is a side elevational view of an inspection system 100 that includes the unmanned aircraft 102 and the instrument 104 inspecting and/or measuring a target surface 106; and, in communication with a station. In this example the unmanned aircraft 102 is illustrated as unmanned aerial vehicles, and more specifically as unmanned rotorcraft. Alternatively, the unmanned aircraft 102 can include any configuration that enables inspection and measurement as described herein.

The unmanned aircraft 102 includes a frame 108 having a plurality of arms 110. In the exemplary embodiment, the plurality of arms 110 includes a first arm 112, a second arm 114, and a third arm 116. Alternatively, the plurality of arms 110 can include less than three arms or more than three arms. The first arm 112 includes a proximal end 118, a distal end 120, and a body 122 located there between. A first longitudinal axis 124 is disposed along the first body 122. The second arm 114 includes a proximal end 126, a distal end 128, and a body 130 located there between. A second longitudinal axis 132 is disposed along the second body 130. The third arm 116 includes a proximal end 134, a distal end 136, and a body 138 located there between. A third longitudinal axis 140 is disposed along the third body 138. In an embodiment, the second arm 114 and the third arm 116 are angularly coupled to the first arm 112. More particularly, the second arm 114 and the third arm 116 are coupled respectively to the first arm 112 from about 30 degrees to approximately 5 degrees relative to the first arm 112. Alternatively, the second arm 114 and the third arm 116 can couple to the first arm 112 of any angle. The angular coupling of the second arm 114 and the third arm 116 to the first arm 112 provides stabilized lift, attitude, and/or translation. In the exemplary embodiment, the instrument 104 can be coupled to the frame 108 near an intersection of the proximal ends 118, 126, and 134.

As shown, the proximal ends 118, 126, and 134 are coupled to each other in a "Y" configuration. The "Y" configuration is configured to efficiently provide a stabilized lift and attitude control for the frame 108. Moreover, the "Y" configuration is configured to provide a smooth and level translation of the frame 108 during flight operations. Alternatively, the proximal ends 118, 126, and 134 can couple to each other in other configurations such as, for example only, a "T" configuration and a "U" configuration which also provide stabilized lift, attitude, and/or translation of the frame 108 during flight operations.

Each of the first arm 112, the second arm 114, and the third arm 116 can include a length of the body from about 1 inch to about 36 inches to further provide stabilized lift, attitude, and/or translation. The lengths of the first arm 112, the second arm 114, and the third arms 116 can be any length to create a selective balance for a proper center of gravity for any load distribution on the unmanned aircraft 102. Alternatively, each of the first arm 112, the second arm 114, and the third arm 116 could include any length to enable the unmanned aircraft 102 to function as described herein. Moreover, each of the first arm 112, the second arm 114, and the third arm 116 can include a plurality of material compositions such as, for example, metals, plastics, alloys, and composites to enable the unmanned aircraft 102 to function efficiently and cost effectively. Additionally, the material composition of the frame 108 can withstand a plurality of environmental conditions.

The unmanned aircraft 102 includes a first propulsion system 142 coupled to the frame 108. The first motor propulsion system 142 includes a first motor 144 coupled to the distal end 128 of the first arm 112. A second motor 146 of the first propulsion system 142 is coupled to the second arm 114 on the second body 130 and between the proximal end 126 and the distal end 128 of the second arm 114. The first motor propulsion system 142 further includes a third motor 148 coupled to a third arm 116 and on the third body 138 located between the proximal end 134 and the distal end 136 of the third arm 116. Each of the first motor 144, the second motor 146, and the third motor 148 include a respective propeller 150 configured for flight operations.

In the exemplary embodiment, the first motor 144 is coupled to the first distal end 120 of the first arm 112 and perpendicular to the first axis 124. The second motor 146 is coupled to the second body 130 and perpendicular to the second axis 132. The third motor 148 is coupled to the third body 138 and perpendicular to the third axis 140. It should be understood that the first motor 144, the second motor 146, and the third motor 148 can couple to any location relative to the first arm 112, the second arm 114, and the third arm 116 respectively. For example, the motors 144, 146, and 148 can couple at any location and/or orientation to the arms 112, 114, and 166 such that the combination of the motor vectors counteracts the force due to gravity. More particularly, the motors 144, 146, and 148 can be placed in any orientation so that the sum of the motor vectors opposes gravity.

The configuration of the first arm 112, the second arm 114, and the third arm 116; and, the configuration of the first motor 144, the second motor 146, and the third motor 148 are configured to facilitate lift/altitude and attitude control of the frame 108 during flight operations. More particularly, the first propulsion system 142 is configured to facilitate maintaining a constant altitude and level attitude relative to the target surface 106. Moreover, the first propulsion system 142 is configured to move the frame 108, in a plurality of positions during a plurality of environmental conditions, to facilitate maintaining the orientation of the instrument 104 perpendicular to the target surface 106 while the instrument 104 conducts a measurement. For example, the first propulsion system 142 is configured to orientate the instrument 104 to measure altitude perpendicular to the target surface 106. To facilitate maintaining a specific attitude of the frame 108 during flight operations, the first propulsion system 142 is configured to perform a pitch maneuver. Additionally, during flight operations, the first propulsion system 142 is configured to perform role maneuvers to facilitate maintaining a specific attitude of the frame 108 relative to the target surface 106.

To facilitate maintaining translation and drift correction, the first propulsion system 142 is configured to perform a yaw maneuver. In the exemplary embodiment, the yaw can be achieved by differentiating torques relative to the propellers 150. As an example, to turn or yaw, one motor/propeller is sped up or slowed down relative to another motor/propeller. More particularly, yaw can be accomplished in traditional multi rotor designs by using contra rotating propellers on the lift rotors. The torque of clockwise rotating lift motors of one motor or group of motors (group A) is balanced by the torque of counter clockwise rotating lift of another motor(s). When a yaw correction is required torque of one group is increased while the torque of the other group is reduced by an equal amount. In this way the total lift supplied to the aircraft stays constant (altitude does not change) while a yaw rotational moment of inertia is applied to rotate the craft on its vertical axis to the desired heading.

The unmanned aircraft 102 includes a second propulsion system 152 coupled to the frame 108. The second propulsion system 152 includes a fourth motor 154 coupled to the distal end 128 of the second arm 114. A fifth motor 156 of the second propulsion system 152 is coupled to the distal end 136 of the third arm 116. Each of the fourth motor 154 and the fifth motor 156 include a respective propeller 150 configured for flight operations. In the exemplary embodiment, the fourth motor 154 is coupled to the distal end 128 of the second arm 114 and collinear with the second axis 132. The fifth motor 156 is coupled to the distal end 136 of the third arm 116 and collinear with the third axis 140.

In an alternative embodiment, at least one additional motor (not shown) can be coupled to the frame 108. The additional motor is configured to facilitate slowing down or braking the unmanned aircraft 102. For example, In the situation where the sensors need to acquire data while the unmanned aircraft 102 flies at a constant slow speed, a "tail wind" might make it difficult or impossible to fly slow enough in a downwind segment of flight to take measurements. Without the additional motor, measurements under these conditions would have to be made while flying into a headwind. This makes the down leg of flight useless for the measurement process, doubling the time necessary to conduct the process. The additional motor could be used to slow the unmanned aircraft 102 down to a usable speed during the downwind segment of flight allowing both upwind and downwind legs to be used to take measurements.

The configuration of the first arm 112, the second arm 114, the third arm 116; and, the configuration of the fourth motor 154 and the fifth motor 156 are configured to facilitate translation and drift of the frame 108 during flight operations. Moreover, the second propulsion system 152 is configured to move the frame 108, to a plurality of positions and in a plurality of environmental conditions, to facilitate maintaining the orientation of the instrument 104 perpendicular to the target surface 106. Additionally, during flight operations, the second propulsion system 152 is configured to perform a vectoring maneuver to facilitate translation and drift correction at the frame 108. In a forward flight, the fourth motor 154 and the fifth motor 156 can operate at the same speed to facilitate providing a substantially straight forward line of flight. In a cross-wind, the upwind motor will operate faster than the downwind motor to compensate for drift.

The fourth motor 154 and the fifth motor 156 are configured to remove pitch and bank adjustments to control flight. In the exemplary embodiment, pitch gimbals and/or bank gimbals are not required to stabilize the instrumentation payload. As one result, weight and power consumption of the unmanned aircraft 102 are reduced based at least on the configuration of the frame 108, the first propulsion system 142, and the second propulsion system 152. The unmanned aircraft 102 is configured to conduct flight operations as a secondary role to a primary role of carrying instrumentation during flight operations to facilitate delivering high accuracy inspection and/or measurement by the instrument 104. In an alternative embodiment, the unmanned aircraft 102 can include an air foil and/or wings coupled to the frame 108 to facilitate flight operations.

In the exemplary embodiment, the instrument 104 can include a plurality of instruments such as, for example only, an imaging device 158, a laser 160, an altimeter 162, and a laser altimeter 163. The instrument 104 may also include a plurality of different sensors for providing useful inspection information and/or measurement information to the centralized inspection station 176. For example, a still camera (color and/or black and white) may be used to obtain still images of portions of the target surface 106 being inspected. A video camera may be used to obtain color and/or black and white video of the target surface 106. An infrared camera could also be used to obtain infrared still images or infrared video of the target surface 106. The unmanned aircraft 102 may also include additional sensors such as an ultrasound sensor, an X-Ray sensor, a magnetic sensor or a Hall Effect sensor. (None shown) It will be appreciated that the specific type of inspection operation(s) that the system 100 is expected to be used to perform will likely determine the specific form of sensors that will need to be included on the unmanned aircraft 102. In an embodiment, the instrument 104 can include a paint marker 164 or paint sprayer that is configured to create a marking or drawing on the target surface 106. For example, the paint marker 164 can facilitate a layout of an area of the target surface 106 at full scale at an actual location on the target surface 106.

The unmanned aircraft 102 may include guidance and control hardware and a software system that is able to implement one or more different, stored flight plans from a memory. The unmanned aircraft 102 may include a global positioning system 166 (UPS), for example a real time kinetic ("RTK") global positioning system, for controlling the orientation of and assisting in carrying out any preprogrammed flight plan stored in the memory. The unmanned aircraft 102 can also fly under manual control or random flight programming. A wireless transceiver 168 and an on board antenna 178 enable bidirectional, wireless electromagnetic wave communications with the centralized inspection station 176.

The unmanned aircraft 102 may also include a vehicle health monitoring subsystem, a battery for powering the electronic devices carried on the unmanned aircraft, as well as a fuel level sensor. The vehicle health monitoring subsystem may be used to monitor the battery level of the battery and the fuel reservoir level sensor and generate suitable signals that may be periodically transmitted to the centralized inspection station 176. If an issue develops with the unmanned aircraft 102, for example a sudden drop in battery power to an unacceptable level, this enables the centralized inspection station 175 to be wirelessly informed of this condition.

The unmanned aircraft 102 may also include an image/audio memory 170 for maintaining electronic copies of the images, video or audio captured during an inspection process. If this option is implemented, then an interface may be included on each unmanned aircraft 102 that enables an external device, for example a lap top computer, to be coupled to the interface and used to download the stored images and/or audio obtained during the previously executed inspection process. The interface could be formed by any suitable interface. The interface could also be implemented using Blue-tooth technology so that a wireless connection can be made with the image/audio memory. The interface could also be used for enabling a wired connection to the unmanned to upload programs or other information without the need for a wireless transceiver 168 to be used on the unmanned aircraft 102. The use of the image/audio memory may be advantageous in environments where periodic high levels of electromagnetic interference are to be expected, which could affect the ability of the acquired images and audio data to be reliably transmitted via electromagnetic wave signals to the centralized inspection station 176.

The instrument 104 is configured to conduct inspection or measurements of the target surface 106. While the target surface 106 is illustrated as a bridge, and a terrain, the unmanned aircraft 102 is equally well adapted for use in inspecting a wide range of other structures including, but not limited to, power lines, power generating facilities, roadways, power grids, dams, levees, stadiums, buildings, antennas and telescopes, water treatment facilities, oil refineries, chemical processing plants, high rise buildings, and infrastructure associated with trains. The unmanned aircraft 102 can be used inside large buildings such as manufacturing facilities and warehouses.

The target surface 106 may also include a terrain 174 such as, for example only, a construction area, a lay down area, a disaster area, a landfill, real estate, a survey area, farm boundaries, flood plain identification, and pond size/acreage. The terrain 174 of the target surface 106 can relate to, for example only, landfill management, compost settlement, land settling, agriculture, livestock fencing, resource harvesting, erosion control, re-grading or terracing ground, regrading for irrigation, and tillable land calculations. Still further, the terrain 174 of the target surface 106 can include, utility locations, online marking procedures such as "Missouri One Call" procedures. The terrain 174 may also include a parking lot (either temporary or permanent), and temporary emergency areas. Virtually any surface that would be difficult, costly, or too hazardous to inspect by a human piloted vehicle may potentially be inspected using the unmanned aircraft 102.

The system 100 includes the remote centralized inspection station 176 for receiving wireless communications from the unmanned aircraft 102. The centralized inspection station 176 may include the antenna 178, a computer control system, a display for viewing by an inspection technician or operator, such as a CRT, LCD or plasma screen, and the wireless transceiver 168. The wireless transceiver 168 is in communication with the antenna 178 for enabling wireless communication between the computer control system and the unmanned aircraft 102. The computer control system may be used to send commands or to monitor various operating performance parameters of the unmanned aircraft 102 such as fuel remaining, battery power remaining, etc. The computer control system may also be used generate commands to alter the flight plan of the unmanned aircraft 102.

While the centralized inspection station 176 is illustrated as being a terrestrial based station, it could just as readily be formed as a mobile inspection station on an aircraft or human piloted rotorcraft. A land based, mobile inspection station could also be used. Accordingly, the centralized inspection station 176 does not necessarily need to be a fixed structure or facility. It is also possible for the unmanned aircraft 102 to communicate with the centralized inspection station 176 via a transponded satellite and/or using a wide area network or a local area network.

Figure 3:
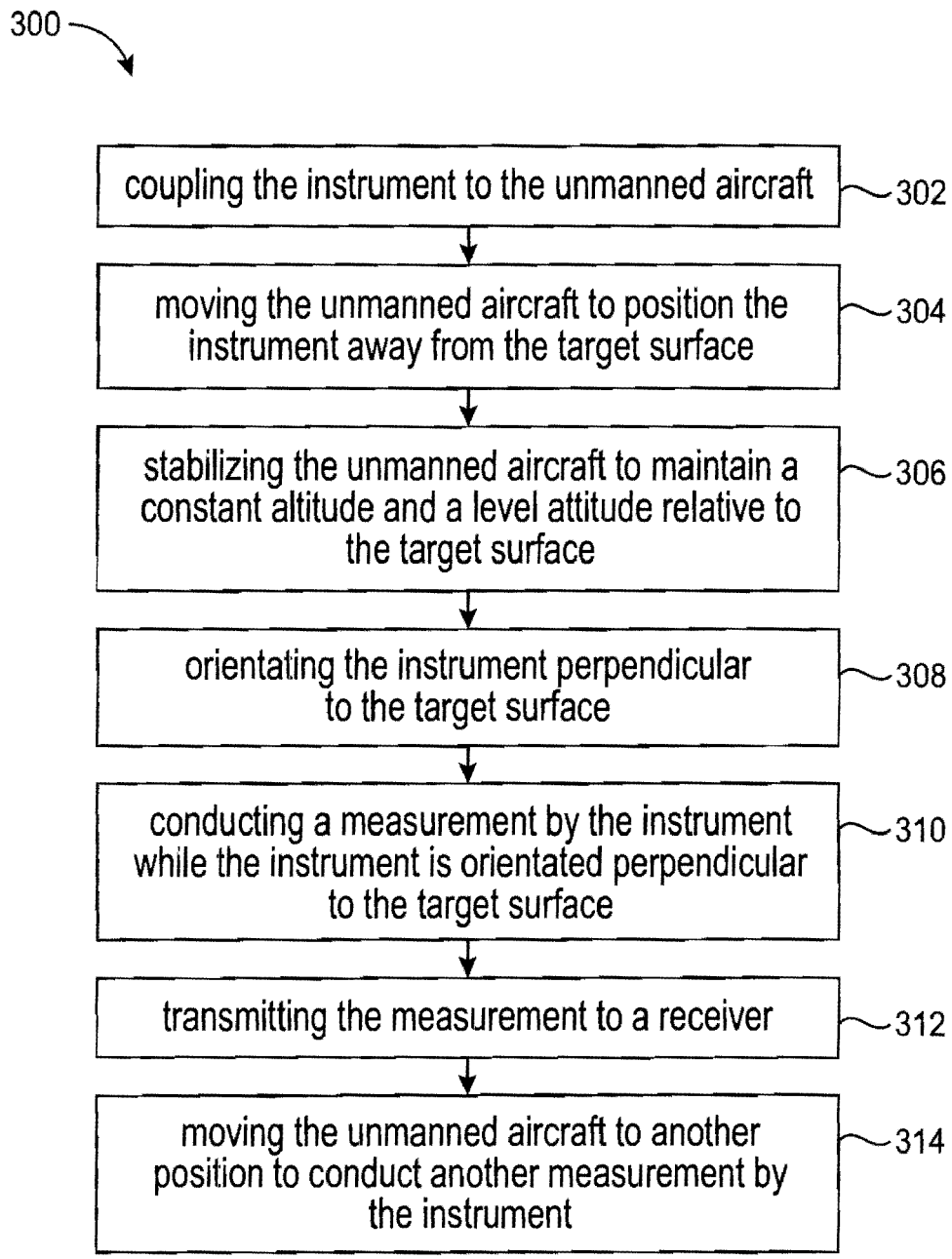
FIG. 3 is a flowchart of exemplary steps of a method of positioning the instrument by the unmanned aircraft for inspection and/or measurement purposes relative to the target surface.

FIG. 3 is a flow chart of exemplary steps of a method 300 of positioning the instrument 104 by the unmanned aircraft 102 for inspection and/or measurement purposes relative to and relating to the target surface 106. During an exemplary flight operation inspection, the instrument 104 is coupled 302 to the unmanned aircraft 102. In one method 300, the instrument 104 is removably coupled to the unmanned aircraft 102 to provide access for a plurality of instruments to be coupled to the frame 108. In an embodiment, the coupled instrument 104 includes at least one of a camera, a laser 160, altimeter 162, laser altimeter 163, and a paint marker 164. Moreover, a global positioning system 166 can be coupled to the unmanned aircraft 102.

The method 300 includes moving 304 the unmanned aircraft 102 toward the target surface 106. During flight, the unmanned aircraft 102 positions the instrument 104 away from the target surface 106. During flight translation, the unmanned aircraft 102 can be manually controlled by a user. Alternatively, the unmanned aircraft 102 can be preprogrammed with a predetermined flight pattern relative to the target surface 106. In another embodiment, the unmanned aircraft 102 can be programmed to conduct a random flight pattern relative to the target surface 106.

During flight translation, the unmanned aircraft 102 is stabilized 306 to maintain the frame 108 and the instrument 104 at a constant altitude and a level attitude relative to the target surface 106. Stabilizing the unmanned aircraft 102 includes detecting at least one weather parameter such as, for example only, high winds, and adjusting the position of the unmanned aircraft 102 in response to the weather parameter.

The unmanned aircraft 102 moves within a plurality of positions to maintain the frame 108 parallel to the target surface 106 and to orientate 308 the instrument 104 perpendicular to the target surface 106. For example, the first motor 144, the second motor 146, and the third motor 148 provide lift and attitude control of the frame 108 during flight operations. The first propulsion system 142 directs at least one of the first motor 144, the second motor 146, and the third motor 148 to perform pitch maneuvers and/or roll maneuvers and/or yaw maneuvers to maintain a specific altitude and/or attitude of the frame 108 relative to the target surface 106. The flight maneuvers generated by the first propulsion system 132 facilitate orientating the instrument 104 perpendicular to the target surface 106.

Additionally, the fourth motor 154 and the fifth motor 156 provide translation and drift control of the frame 108 during flight operations. The second propulsion system 152 directs at least one of the fourth motor 154 and the fifth motor 156 to perform vectoring maneuvers to maintain stabilized translation and correct for drift. These flight maneuvers generated by the second propulsion system 152 facilitate orientating the instrument 104 perpendicular to the target surface 106. During flight, the unmanned aircraft 102 maintains the instrument 104 perpendicular to the target surface 106 without the need or use of pitch gimbals and/or bank gimbals.

While the instrument 104 is stabilized perpendicular to the target surface 106, the instrument 104 conducts 310 an inspection and/or measurement to obtain data relating to the target surface 106. In an embodiment, the above ground altimeter 162 conducts an altitude reading of the target surface 106. In another embodiment, the camera or video instrument captures an image of the target surface 106. In a further embodiment, the paint marker instrument 164 applies a paint mark to the target surface 106. In another embodiment, the laser instrument 160 such as, for example, only a laser altimeter, measures a distance of the target surface 106. The instrument 104 can include any the type of inspection and/or measurement that is relevant to the target surface 106.

For example, as the unmanned aircraft 102 is stabilized in space, the laser instrument 106 can take multiple measurements from point to point on the terrain surface 174. The multiple point to point laser scanning is configured to map lines to determine the contour of the terrain surface 174. The point to point measurements are configured to map or plot a point cloud of the terrain surface 174. Instead of getting a measurement point of a time, the laser instrument 160 can map or plot a line segment at a time. As another example, the video camera instrument takes multiple images or pictures at a plurality of locations to conduct a photogrammetry of the overlaid images/pictures of the target surface 106. During the inspection/measurement process, the instrument 104 obtains data relating to the target surface 106 to obtain precision information at a precisely known location. The information is obtained by a precise altitude above the target surface 106 with a simple instrument. After conducting the measurements, the unmanned aircraft 102 is moved 314 to another location/position to conduct further measurements by the instrument 104.

In one exemplary method 300, the data is captured using the at least one instrument 104 at a periodic rate, which are stored on the memory 170. A timestamp is recorded for each of the data, and position information is recorded for each of the plurality of data using the GPS system 166, wherein the position information indicates the spatial position of the unmanned aircraft 102 at the time each of the plurality of data was taken. The data, timestamps and position information for each of the data are recorded on the memory 170 and later transferred to the database for processing.

After the data is collected, the data is transferred 312 from the transceiver 168 to the antenna of the station 176 for post processing. In post-processing for captured images, for example, pattern recognition and image analysis algorithms can be used to detect a plurality of structure features for example shown in the plurality of images. The features can include, but are not limited to, cracks, bridge decks, joints, corrosion, voids or other features. The plurality of structure features is analyzed using a management software application in order to determine bridge rating metrics for the bridge and bridge components. The post processing algorithms minimize the position error of image features of interest based on multiple views of the features from known locations and perspectives combined with metrology target locations within images, where applicable.

A three dimensional geometry can produced for the structure of the target surface 106 from the plurality of images using a virtual reality software application, and a virtual model of the structure is produced by mapping the plurality of images onto the three dimensional geometry skeleton using an information modeling software application. A user may perform a visual inspection of the structure by viewing the virtual model of the structure in the three-dimensional software environment. The three dimensional software environment allows results from the post processing algorithms to be used for inspection, quantitative measurements (within accuracy limits), defect and deterioration visualization, structure element investigation, on-site inspection planning (as may be required), and customizable viewing and analysis options.

Image processing and pattern recognition software is used to detect and identify features of interest within the plurality of images, including components and deterioration or distress phenomena such as, but not limited to, material cracking and structural defects. The virtual model of the target surface 106 can be displayed with a data viewer software in order to perform a virtual inspection of the target surface 106.

Data acquired by the instrument 104 of the unmanned aircraft 102 can be either downlinked in real time to the centralized inspection station 176, thus permitting real time analysis of the data, or saved for analysis at a later time. For data such as video, that requires greater bandwidth to downlink, this feature may be advantageous in certain applications where bandwidth of the downlink is limited, and any potential flaws in the structure being inspected would not be of such nature as to produce conditions that threaten human safety or property. Yet other applications will exist where it would be important to be immediately apprised of a major structural flaw, such as on a bridge heavily traveled by cars and trucks. In such an instance, if a major structural flaw was discovered on a bridge, the real time downlinking capability of the system 100 would enable the acquired inspection images to be processed in real time.

Exemplary embodiments of an inspection system are described herein. The methods and assemblies are not limited to the specific embodiments described herein, but rather, components of assemblies and/or steps of the methods may be utilized independently and separately from other components and/or steps described herein. For example, the methods may also be used in combination with other assemblies and methods, and are not limited to practice with only the assemblies and methods described herein. Rather, the exemplary embodiments may be implemented and utilized in connection with many other inspection/measurements such as, for example only, real estate surveying, construction activities, and land terrains. Additionally the term "perpendicular" can mean actual perpendicularity or substantially perpendicular to the target surface or ground surface. Moreover, "perpendicular' can relate to a perpendicular distance from an imaginary plane relative to sea level. The term perpendicular can take into consideration and account for curvature of the earth's surface and/or the target surface/ground surface having a shape such as, for example only, curved, slanted, and inclined.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using devices or assemblies or systems and performing any incorporated method. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of positioning an instrument by an unmanned aircraft for measurement purposes relating to a target surface, the method comprising:
 coupling the instrument to an aircraft frame of the unmanned aircraft, the aircraft frame including a first arm, a second arm, and a third arm coupled to each other;
 moving the unmanned aircraft to position the instrument away from the target surface;
 detecting one or more parameters associated with the target surface;
 using the one or more parameters to determine one or more controls for maintaining a constant altitude and a level attitude relative to the target surface;
 using the one or more controls to manage a plurality of motor propulsion systems coupled to the aircraft frame to position the unmanned aircraft such that the instrument is orientated perpendicular to the target surface, the plurality of motor propulsion systems including a first motor propulsion system configured to facilitate lift/altitude and attitude control for the aircraft frame and a second motor propulsion system configured to facilitate translation and drift control for the aircraft frame, the second motor propulsion system including one motor coupled to a distal end of the second arm and an other motor coupled to a distal end of the third arm;
 conducting a measurement by the instrument while the unmanned aircraft is positioned such that the instrument is orientated perpendicular to the target surface; and
 transmitting the measurement to a receiver.

2. The method of positioning the instrument of claim 1 further comprising coupling at least one of a global positioning system and an above ground altimeter to the unmanned aircraft.

3. The method of positioning the instrument of claim 1 further comprising an altimeter to the unmanned aircraft, wherein moving the unmanned aircraft comprises moving the altimeter to measure altitude perpendicular to the target surface.

4. The method of positioning the instrument of claim 1 wherein coupling the instrument to the unmanned aircraft comprises coupling at least one of a camera, a laser, and a laser altimeter to the unmanned aircraft.

5. The method of positioning the instrument of claim 1 wherein coupling the instrument comprises removably coupling the instrument to the unmanned aircraft.

6. The method of positioning the instrument of claim 1 wherein moving the unmanned aircraft comprises moving the unmanned aircraft in a plurality of positions while maintaining the unmanned aircraft parallel to the target surface and managing the plurality of motor propulsion systems to position the unmanned aircraft such that the instrument is orientated perpendicular to the target surface.

7. The method of positioning the instrument of claim 1 wherein detecting the one or more parameters associated with the target surface comprises detecting at least one weather parameter, and wherein using the one or more parameters comprises adjusting the position of the unmanned aircraft based on the at least one weather parameter.

8. The method of positioning the instrument of claim 1 wherein conducting the measurement comprises identifying that the unmanned aircraft is stabilized, and conducting the measurement while the unmanned aircraft is stabilized.

9. The method of positioning the instrument of claim 1 wherein conducting the measurement comprises capturing an image by a camera while the unmanned aircraft is positioned such that the instrument is orientated perpendicular to the target surface.

10. The method of positioning the instrument of claim 1 wherein conducting the measurement comprises measuring a distance to the target surface using a laser.

11. The method of positioning the instrument of claim 1 where transmitting the measurement comprises transmitting the measurement to a remote memory of the receiver.

12. An unmanned aircraft for positioning an instrument for measurement purposes relative to a target surface during flight operations of the unmanned aircraft, the unmanned aircraft comprising:
 an aircraft frame comprising a first arm, a second arm, and a third arm coupled to each other, the aircraft frame is configured to couple to the instrument;
 a first motor propulsion system coupled to the aircraft frame and configured to facilitate lift/altitude and attitude control for the aircraft frame; and
 a second motor propulsion system coupled to the aircraft frame and configured to facilitate translation and drift control for the aircraft frame, the second motor propulsion system comprising one motor coupled to a distal end of the second arm and an other motor coupled to a distal end of the third arm, wherein the first motor propulsion system and the second motor propulsion system are configured to stabilize the aircraft frame and to orientate the unmanned aircraft such that the instrument is perpendicular to the target surface during the flight operations.

13. The unmanned aircraft of claim 12 wherein the first propulsion system is configured to perform at least one of a pitch maneuver and a roll maneuver to facilitate maintaining a specific attitude of the aircraft frame.

14. The unmanned aircraft of claim 12 wherein the second propulsion system is configured to perform at least one of a yaw maneuver and a vectoring maneuver to facilitate translation of the aircraft frame.

15. The unmanned aircraft of claim 12 wherein the first arm, the second arm, and the third arm are coupled to each other in a "Y" configuration.

16. The unmanned aircraft of claim 12 wherein the second arm and the third arm are angularly coupled to the first arm at a range from about 30 degrees to about 75 degrees relative to the first arm.

17. The unmanned aircraft of claim 12 wherein each of the first arm, the second arm, and the third arm comprise a proximal end, the instrument coupled to the aircraft frame near an intersection of the respective proximal ends.

18. The unmanned aircraft of claim 12 wherein the first motor propulsion system comprises a first motor coupled to a distal end of the first arm, a second motor coupled to the second arm and in between a proximal end and the distal end of the second arm, and a third motor coupled to the third arm and in between a proximal end and the distal end of the third arm.

19. The unmanned aircraft of claim 18 wherein the first motor, the second motor, and the third motor are coupled perpendicular to each axis of the respective first arm, the second arm, and the third arm, and the fourth one motor is coupled co-linearly relative to the axis of the second arm and the fifth other motor is coupled co-linearly relative to the axis of the third arm.

20. The unmanned aircraft of claim 12 wherein the first motor propulsion system and the second motor propulsion system are configured to move the aircraft frame in a plurality of positions while maintaining an orientation of the instrument perpendicular to the target surface.

21. The unmanned aircraft of claim 12 further comprising an airfoil coupled to the aircraft frame.

22. A system for inspecting a target surface comprising:
an unmanned aircraft configured to inspect the target surface during flight operations of the unmanned aircraft, the unmanned aircraft comprising:
an aircraft frame comprising a first arm, a second arm, and a third arm coupled to each other;
a first motor propulsion system coupled to the aircraft frame and configured to facilitate lift/altitude and attitude control for the aircraft frame, the second motor propulsion system comprising one motor coupled to a distal end of the second arm and an other motor coupled to a distal end of the third arm; and
a second motor propulsion system coupled to the aircraft frame configured to facilitate translation and drift control for the aircraft frame;
an instrument coupled to the aircraft frame and configured to take a measurement relative to the target surface and transmit the measurement, wherein the first motor propulsion system and the second motor propulsion system are configured to stabilize the aircraft frame and to orientate the unmanned aircraft such that the instrument is perpendicular to the target surface during the flight operations; and
a centralized inspection station communicatively coupled to the instrument and configured to receive the measurement and analyze the measurement to facilitate generating a virtual model of the target surface.

23. A method of positioning an instrument by an unmanned aircraft for measurement purposes relating to a target surface, the method comprising:
coupling the instrument to an aircraft frame of the unmanned aircraft, the aircraft frame including a first arm, a second arm, and a third arm coupled to each other, the first arm having a first axis, the second arm having a second axis, and the third arm having a third axis;
moving the unmanned aircraft to position the instrument away from the target surface;
detecting one or more parameters associated with the target surface;
using the one or more parameters to determine one or more controls for maintaining a constant altitude and a level attitude relative to the target surface;
using the one or more controls to manage a plurality of motor propulsion systems coupled to the aircraft frame to position the unmanned aircraft such that the instrument is orientated perpendicular to the target surface, the plurality of motor propulsion systems including a first motor propulsion system configured to facilitate lift/altitude and attitude control for the aircraft frame and a second motor propulsion system configured to facilitate translation and drift control for the aircraft frame, the first motor propulsion system including a first motor coupled to the first arm perpendicular to the first axis, a second motor coupled to the second arm perpendicular to the second axis, and a third motor coupled to the third arm perpendicular to the third axis, the second motor propulsion system including a fourth motor coupled co-linearly relative to the second axis and a fifth motor coupled co-linearly relative to the third axis;
conducting a measurement by the instrument while the unmanned aircraft is positioned such that the instrument is orientated perpendicular to the target surface; and
transmitting the measurement to a receiver.

24. An unmanned aircraft for positioning an instrument for measurement purposes relative to a target surface during flight operations of the unmanned aircraft, the unmanned aircraft comprising:
an aircraft frame coupleable to the instrument, the aircraft frame comprising a first arm, a second arm, and a third arm coupled to each other, the first arm having a first axis, the second arm having a second axis, and the third arm having a third axis;
a first motor propulsion system coupled to the aircraft frame and configured to facilitate lift/altitude and attitude control for the aircraft frame, the first motor propulsion system comprising a first motor coupled to the first arm perpendicular to the first axis, a second motor coupled to the second arm perpendicular to the second axis, and a third motor coupled to the third arm perpendicular to the third axis; and
a second motor propulsion system coupled to the aircraft frame and configured to facilitate translation and drift control for the aircraft frame, the second motor propulsion system comprising a fourth motor coupled co-linearly relative to the second axis and a fifth motor coupled co-linearly relative to the third axis, wherein the first motor propulsion system and the second motor propulsion system are configured to stabilize the aircraft frame and to orientate the unmanned aircraft such that the instrument is perpendicular to the target surface during the flight operations.

25. A system for inspecting a target surface comprising:
an unmanned aircraft configured to inspect the target surface during flight operations of the unmanned aircraft, the unmanned aircraft comprising:
an aircraft frame comprising a first arm, a second arm, and a third arm coupled to each other, the first arm having a first axis, the second arm having a second axis, and the third arm having a third axis;
a first motor propulsion system coupled to the aircraft frame and configured to facilitate lift/altitude and attitude control for the aircraft frame, the first motor propulsion system comprising a first motor coupled to the first arm perpendicular to the first axis, a second motor coupled to the second arm perpendicular to the second axis, and a third motor coupled to the third arm perpendicular to the third axis; and
a second motor propulsion system coupled to the aircraft frame configured to facilitate translation and drift control for the aircraft frame, the second motor propulsion system comprising a fourth motor coupled co-linearly relative to the second axis and a fifth motor coupled co-linearly relative to the third axis;

an instrument coupled to the aircraft frame and configured to take a measurement relative to the target surface and transmit the measurement, wherein the first motor propulsion system and the second motor propulsion system are configured to stabilize the aircraft frame and to orientate the unmanned aircraft such that the instrument is perpendicular to the target surface during the flight operations; and a centralized inspection station communicatively coupled to the instrument and configured to receive the measurement and analyze the measurement to facilitate generating a virtual model of the target surface.

* * * * *